United States Patent
Ryu

(10) Patent No.: US 7,792,372 B2
(45) Date of Patent: Sep. 7, 2010

(54) METHOD AND APPARATUS FOR ENCODING/DECODING IMAGE BASED ON REGION OF INTEREST

(75) Inventor: Kwang-yuel Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 11/646,344

(22) Filed: Dec. 28, 2006

(65) Prior Publication Data

US 2007/0189623 A1    Aug. 16, 2007

(30) Foreign Application Priority Data

Jan. 9, 2006    (KR)    ...................... 10-2006-0002366

(51) Int. Cl.
*G06K 9/36* (2006.01)
*H04B 1/66* (2006.01)

(52) U.S. Cl. .................... 382/232; 348/384.1; 375/240; 358/426.01

(58) Field of Classification Search ......... 382/232–253; 375/240–241; 348/384.1–440.1; 358/426.01–426.16
See application file for complete search history.

(56) References Cited

U.S. PATENT DOCUMENTS

| | | | | |
|---|---|---|---|---|
| 5,046,119 A | * | 9/1991 | Hoffert et al. | 382/166 |
| 5,097,518 A | * | 3/1992 | Scott et al. | 382/298 |
| 5,644,406 A | * | 7/1997 | Harrington et al. | 382/239 |
| 7,162,095 B2 | * | 1/2007 | Chen et al. | 382/240 |
| 7,564,902 B2 | * | 7/2009 | Sasai et al. | 375/240.26 |

OTHER PUBLICATIONS

Wang et al., IEEE Publication, 2004, "Error resilient ROI coding using pre- and post-processing for video sequences" (pp. 757-760).*

* cited by examiner

*Primary Examiner*—Manav Seth
(74) *Attorney, Agent, or Firm*—Sughrue Mion, PLLC

(57) ABSTRACT

A method and apparatus are provided for encoding/decoding an image based on a region of interest (ROI). The method and apparatus provide error-resilience by duplicating ROI data in a variable manner according to image features or by reducing non-ROI data. The ROI based image encoding apparatus and method estimate a complexity for each block located in the ROI of an image, transform the image by creating more duplicate blocks for ROI blocks having high complexity and fewer duplicate blocks for ROI blocks having low complexity, and encode the transformed image.

26 Claims, 7 Drawing Sheets

METHOD AND APPARATUS FOR ENCODING/DECODING IMAGE BASED ON REGION OF INTEREST

CROSS-REFERENCE TO RELATED PATENT APPLICATION

This application claims priority from Korean Patent Application No. 10-2006-0002366, filed on Jan. 9, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding/decoding an image based on a region of interest (ROI), which provide error-resilience by duplicating ROI data in a variable manner according to image features or by reducing non-ROI data when the image is encoded or decoded.

2. Description of the Related Art

In general, image compression is carried out by eliminating data redundancy. To eliminate data redundancy, temporal prediction encoding is performed using motion estimation and motion compensation, spatial prediction encoding is performed by eliminating similar colors or object redundancy within a frames and then transform/quantization and entropy encoding are performed.

When an image is compressed through the aforementioned processes and is transmitted via a transfer medium, errors such as packet loss may occur. An image including an error packet cannot be normally decoded. In particular, when the error packet contains a region of interest (ROI) image, image quality may deteriorate. To solve this problem, an ROI based image encoding method in which an ROI that is relatively more important than other regions is duplicated in a pre-processing operation performed prior to image encoding has been proposed. In this method, even if a portion of information regarding the ROI is lost, the image can be restored using information regarding duplicated other ROI, thereby improving error resilience when errors occur in the ROI.

FIGS. 1A and 1B illustrate an example of a related art ROI based image encoding method. FIG. 2 is a view for explaining a related art ROI based image encoding method.

"Error-Resilient Region-of-Interest Video Coding" (IEEE Transactions On The Circuits and Systems for Video Technology, September 2005, Ali Jerbi, Jian Wang and Shahram Shirani) proposes an image encoding method in which duplicate blocks are created by enlarging an ROI, for example, a face of a person 10 as shown in FIG. 1A, to as much as twice the original size on a block basis, and a non-ROI is downsized by a desired amount according to a relative position with respect to the ROI to configure a transformed image as shown in FIG. 1B, thereby encoding the transformed image.

Referring to FIG. 2, in the conventional ROI based image encoding method, blocks A through F located in an ROI 20 are each duplicated into two blocks. For example, the block A is duplicated into blocks A1 and A2, the block B is duplicated into blocks B1 and B2. Similarly, in this manner, the block F is duplicated into blocks F1 and F2. Meanwhile, blocks a to 1 in a non-ROI are downsized due to the duplication of the ROI blocks. When an image that is reconfigured by duplicating the blocks in the ROI, even if a portion of the ROI of the reconfigured image is lost due to a channel error, information regarding the duplicated other blocks can be used, thereby improving the probability of restoring the image in the ROI.

However, in the related art ROI based image encoding method, all blocks in the ROI are concurrently duplicated at equal magnification without considering the features of an image in the ROI. In other words, whether the blocks are simple or complex, all of the blocks in the ROI are duplicated at the same magnification. For this reason, according to the prior art, a bit assignment cannot be properly carried out for a complex image region which requires relatively more bits within a limited bandwidth. Therefore, ROI blocks corresponding to a simple image consume more bits than necessary, and insufficient data can be used to encode ROI blocks corresponding to a complex image, which makes it difficult to restore an image when errors occur.

SUMMARY OF THE INVENTION

The present invention provides an image encoding/decoding method and apparatus that can realize effective image data transferring with a limited bandwidth and obtain an image in an error resilient manner by defining different duplication magnifications for blocks in an ROI according to image features of the blocks.

According to an aspect of the present invention, there is provided an image encoding method based on an ROI, including: determining an ROI to be duplicated and encoded in an image; estimating image features of blocks located in the ROI; defining duplication magnifications of each of the blocks located in the ROI by using the estimated image features; transforming the image by duplicating the blocks located in the ROI in a specific direction according to the defined duplication magnifications; and encoding the transformed image.

According to another aspect of the present invention, there is provided an image encoding apparatus based on an ROI, including: an ROI determining unit determining an ROI to be duplicated and encoded in an image; an ROI feature estimating unit estimating image features of blocks located in the ROI; a duplication magnification defining unit defining duplication magnifications of each of the blocks located in the ROI by using the estimated image features; an image transform unit transforming the image by duplicating the blocks located in the ROI in a specific direction according to the defined duplication magnifications; and an image encoding unit encoding the transformed image.

According to another aspect of the present invention, there is provided an image decoding method based on an ROI, including: receiving a bit-stream in which a transformed image is encoded by duplicating blocks located in the ROI according to specific duplication magnifications and downsizing blocks located in a non-ROI along a duplication direction of the blocks located in the ROI according to duplication magnifications of the blocks located in the ROI; decoding the transformed image and reading information on a transform map including information on the duplication magnifications of the blocks located in the ROI; restoring an image in the ROI by using a lossless block among a plurality of duplication blocks in the ROI, according to the information on the transform map; and restoring an image in a non-ROI by enlarging an image of the downsized blocks, according to the information on the transform map.

According to another aspect of the present invention, there is provided an image decoding apparatus based on an ROI, including: an image decoding unit decoding a bit-stream in which a transformed image is encoded by duplicating blocks located in the ROI according to specific duplication magnifications and downsizing blocks located in a non-ROI along a duplication direction of the blocks located in the ROI according to duplication magnifications of the blocks located in the ROI, and reading information on a transform map showing information on the duplication magnifications of the blocks located in the ROI from the bit-stream; and an image inverse-transform unit restoring an image by inverse-transforming images in the ROI and non-ROI according to the information on a transform map.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

An image encoding apparatus based on an ROI according to an exemplary embodiment of the present invention estimates complexity for each block located in the ROI of an image, transforms the image by creating more duplicate blocks for ROI blocks having higher complexity and fewer duplicate blocks for ROI blocks having lower complexity, and encodes the transformed image.

Figure 3:
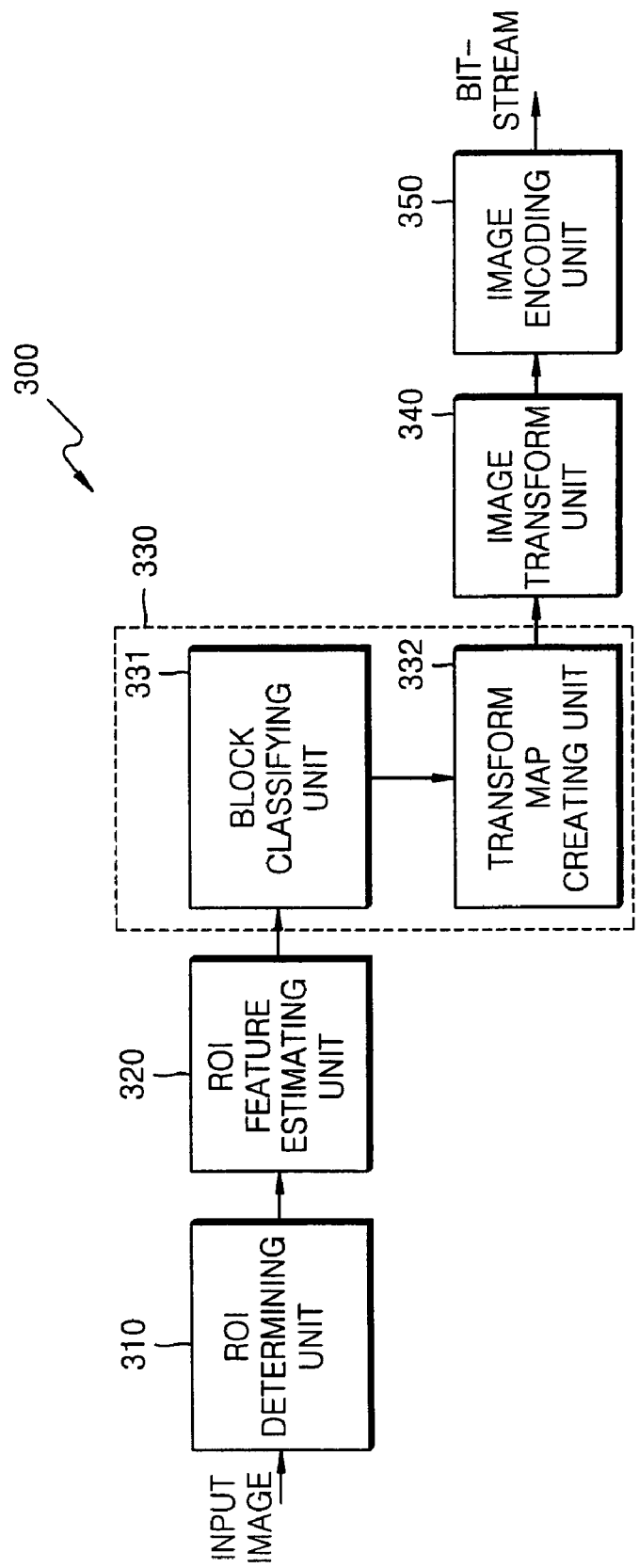
FIG. 3 is a block diagram of an ROI based image encoding apparatus according to an exemplary embodiment of the present invention.

FIG. 3 is a block diagram of an ROI based image encoding apparatus 300 according to an exemplary embodiment of the present invention.

Referring to FIG. 3, the ROI based image encoding apparatus 300 includes an ROI determining unit 310, an ROI feature estimating unit 320, a duplication magnification defining unit 330, an image transform unit 340, and an image encoding unit 350.

Figure 1A:
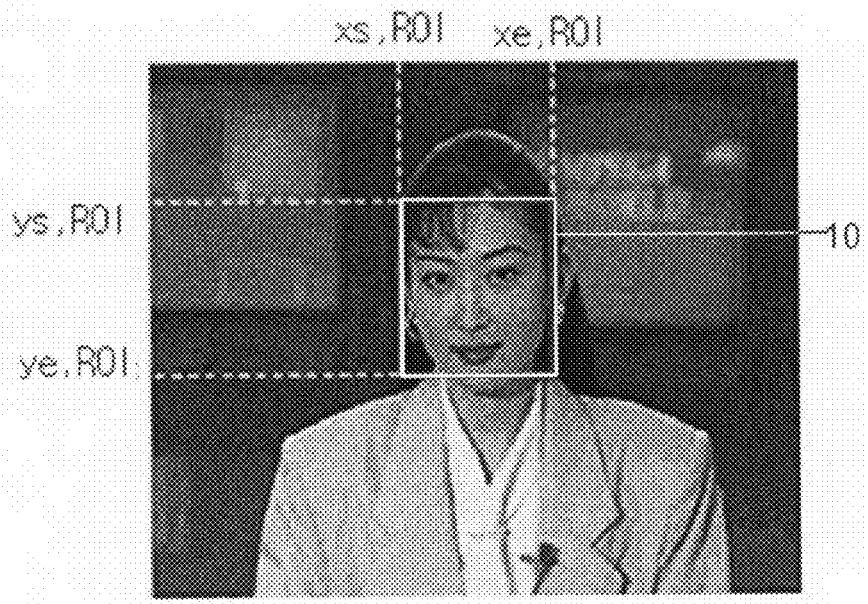
FIGS. 1A and 1B illustrate an example of a related art ROI based image encoding method.
Figure 1B:
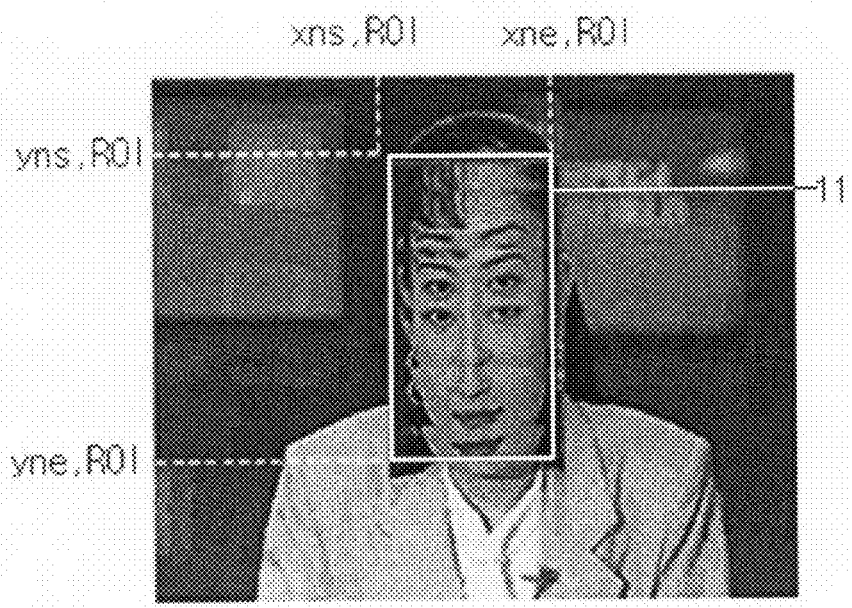
Figure 2:
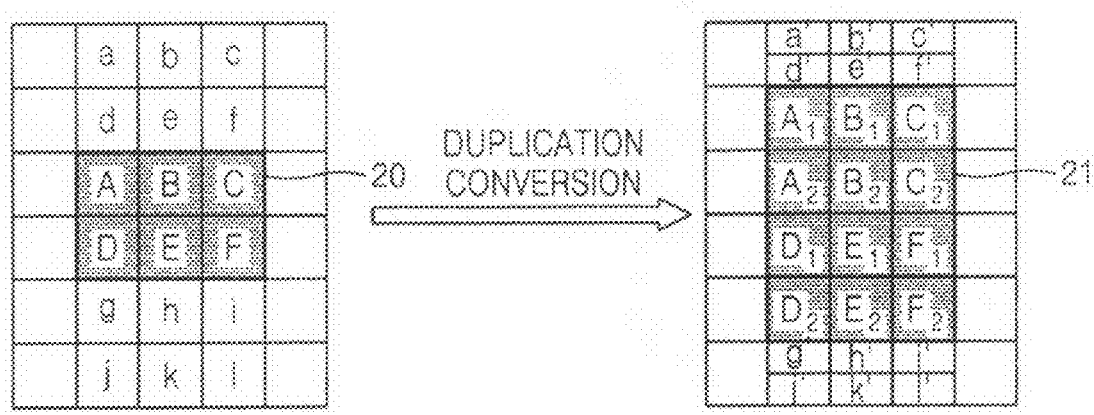
FIG. 2 is a view for explaining a related art ROI based image encoding method.

The ROI determining unit 310 determines an ROI of an input image. The ROI is an image portion that is meaningful to a user. For example, in the images of FIG. 1A, a portion having a lot of motion such as a face portion or a shoulder portion of a person may easily catch a user's eyes, and thus this portion may be defined as the ROI. A region excluding the ROI is defined as a non-ROI. The ROI determining unit 310 allows the user to determine the ROI by selecting an image portion through a specific input unit (not shown), or the ROI in an image is determined by using a ROI detection algorithm known those skilled in the art. The ROI detection algorithm may compare a current frame with a previous frame to determine motion so that an image portion having a motion value greater than a predetermined threshold value can be detected as an ROI.

After the ROI is determined, the ROI feature estimating unit 320 estimates image features of blocks located in the determined ROI. First, the ROI feature estimating unit 320 estimates the complexity of each block located in the ROI. The complexities are used to determine the features of the blocks located in the ROI, and may be determined based on deviation, a mean squared error (MSE), or a sum of absolute difference (SAD). Here, the deviation, the MSE and the SAD are estimated for each block located in the ROI. In other words, the deviation, the MSE and the SAD are estimated based on an average value of pixels included in one block located in the ROI and differences between pixels included in one block.

In addition, the ROI feature estimating unit 320 also estimates an average complexity and a standard deviation of the complexities of all blocks located in the same column or row of the ROI based on the complexity of each block located in the ROI. The ROI feature estimating unit 320 estimates an average complexity and a standard deviation of the complexities of all blocks located in the same column of the ROI when an image in the ROI is duplicated in a vertical direction, and estimates an average complexity and a standard deviation of the complexities of all blocks located in the same row of the ROI when the image in the ROI is duplicated in a horizontal direction The duplication magnification defining unit 330 defines a duplication magnification, which is the degree of duplication of blocks located in the ROI, by using the complexity of each block in the ROI and the average complexity and the standard deviation of the complexities of all blocks located in the same column or row of the ROI. For example, if the duplication magnification is 1.5, one and a half blocks equivalent to the original block are generated by duplication. If the duplication magnification is 2.5, two and a half blocks equivalent to the original block are generated by duplication.

Specifically, the duplication magnification defining unit 330 includes a block classifying unit 331 and a transform map creating unit 332. The block classifying unit 331 compares the complexity of each block in the ROI with the average complexity of all ROI blocks located in the same column or row, and classifies each block in the ROI according to the complexity thereof. The transform map creating unit 332 creates a transform map indicating the respective duplication magnifications of the classified blocks. The transform map created by the transform map creating unit 332 includes information on the duplication magnification assigned to each block. In addition, the transform map creating unit 332 assigns a higher duplication magnification to blocks having a high complexity than to blocks having a low complexity, and assigns a basic duplication magnification M, which is a default duplication magnification of ROI blocks, to blocks having an intermediate complexity.

The image transform unit 340 transforms an image by duplicating each ROI block located in the same column or row according to the transform map generated by the transform map creating unit 332. In addition, the image transform unit 340 downsizes the region affected by duplication among the non-ROI blocks according to a duplication magnification, and does not downsize or enlarge the region unaffected by duplication among the non-ROI blocks.

The image encoding unit 350 compresses and encodes the image transformed by the image transform unit 340. The image encoding unit 350 may use various known image compression methods such as MPEG-2, MPEG-4, and H.264. In addition, the image encoding unit 350 transfers information regarding the duplication magnifications of ROI blocks to a decoding end by adding information regarding the transform map that shows the duplication magnification of each block to a bit-stream header which is output as a result of compression encoding.

Now, the operation of the ROI based image encoding apparatus will be described in detail with reference to FIGS. 4 through 6.

Figure 4:
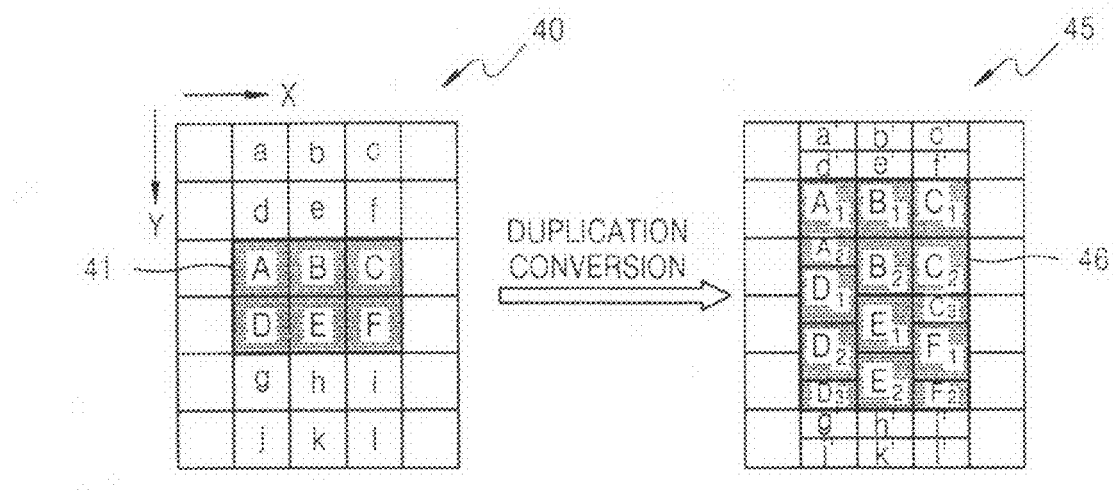
FIG. 4 is a view for explaining the process of transforming an ROI performed in the ROI based image encoding apparatus of FIG. 3.

FIG. 4 is a view for explaining the process of transforming an ROI performed in the ROI based image encoding apparatus of FIG. 3. In FIG. 4, blocks in an ROI 41 are duplicated in a vertical direction. However, the present invention is not limited thereto, and the blocks in the ROI 41 may be duplicated in a horizontal direction.

Referring to FIG. 4, the ROI determining unit 310 determines the ROI 41 from an original image 40 according to a user's selection or a specific algorithm for determining an ROI.

The ROI feature estimating unit 320 estimates image features of blocks A to F located in the determined ROI 41. First, the ROI feature estimating unit 320 estimates the complexity of each block A to F located in the ROI 41. As described above, the complexity may use deviation, an MSE, or a SAD. Next, the ROI feature estimating unit 320 estimates an average complexity and a standard deviation of the complexities of all blocks located in the same column or row in the ROI 41 along a duplication direction of blocks in the ROI 41. In other words, the ROI feature estimating unit 320 estimates an average complexity and a standard deviation of the complexities of all blocks located in the same column in the ROI 41 when the blocks in the ROI 41 are duplicated in a vertical direction, and estimates an average complexity and a standard deviation of the complexities of all blocks located at the same row in the ROI 41 when the blocks in the ROI 41 are duplicated in a horizontal direction. For example, as shown in FIG. 4, when the blocks in the ROI 41 are duplicated in a vertical direction, the ROI feature estimating unit 320 estimates an average complexity and a standard deviation of the complexities of all blocks located in the same column in the ROI 41. That is, the ROI feature estimating unit 320 estimates an average complexity and a standard deviation of the complexities of blocks A and D, an average complexity and a standard deviation of the complexities of blocks B and E, and an average complexity and a standard deviation of the complexities of blocks C and F.

Figure 5:
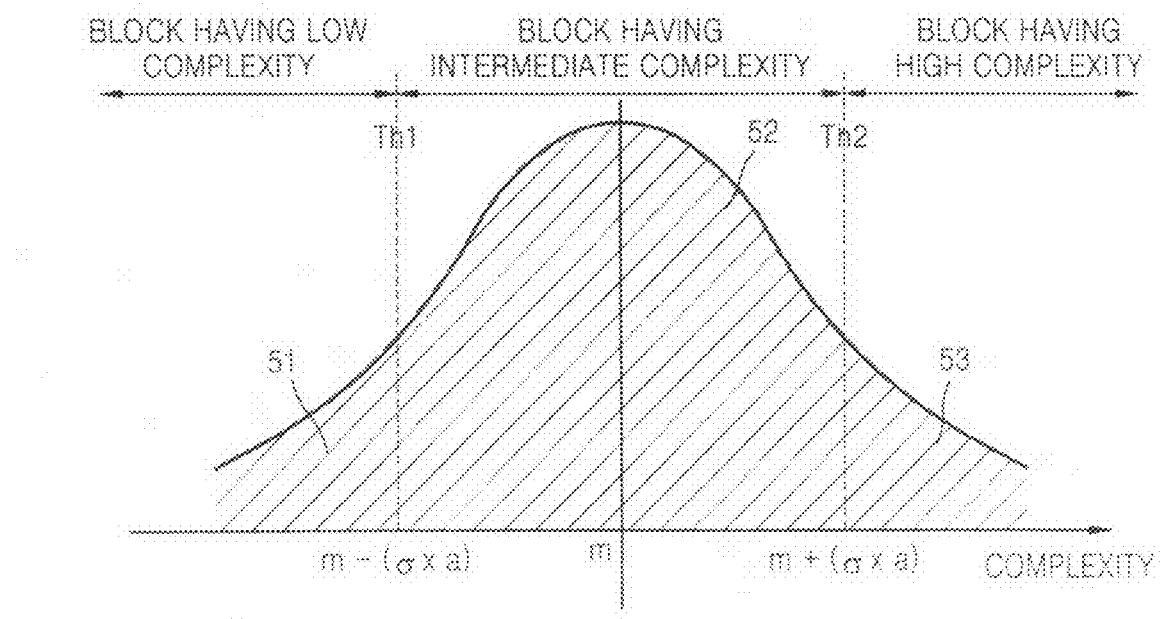
FIG. 5 is a graph for explaining the process by which a block classifying unit of the an ROI based image encoding apparatus of FIG. 3 classifies the complexity of each block in an ROI.

FIG. 5 is a graph for explaining the process by which the block classifying unit 331 classifies the complexity of each block in an ROI. The block classifying unit 331 classifies each ROI block according to the complexity thereof and the average complexity and the standard deviation of the complexities of all blocks located in the same column or row. Referring to FIG. 5, the block classifying unit 331 determines first and second threshold values Th1 and Th2 based on an average complexity of all blocks located in the same column or row of the ROI, and classifies blocks having a complexity higher than the second threshold value Th2 as blocks 53 having a high complexity, blocks having a complexity lower than the first threshold voltage Th1 as blocks 51 having a low complexity, and blocks 52 having an intermediate complexity between the first and second threshold values Th1 and Th2 as blocks 52 having an intermediate complexity.

Specifically, if m is defined as the average complexity of all blocks located in the same column or row in an ROI, $\sigma$ is defined as a standard deviation of the complexities, and a is defined as a transform coefficient for dividing complexity sections (a is a real number), then the block classifying unit 331 classifies blocks having a complexity greater than $m+(\sigma \times a)$ as the blocks 53 having a high complexity, classifies blocks having a complexity lower than $m-(\sigma \times a)$ as the blocks 51 having a low complexity, and classifies blocks having a complexity between $m-(\sigma \times a)$ and $m+(\sigma \times a)$ as the blocks 52 having an intermediate complexity. The block classifying unit 331 adjusts the transform coefficient so that the number of blocks having a high complexity is the same with the number of blocks having a low complexity. For example, in FIG. 4, if the average of blocks A and D located in the same column is m1, the standard deviation is $\sigma 1$, and the transform coefficient is a1, then the block classifying unit 331 classifies the blocks A and D in the ROI according to complexities thereof using the specific threshold values $m1-(\sigma 1 \times a1)$ and $m1+(\sigma 1 \times a1)$. Likewise, the blocks D and E and blocks C and F in the ROI are classified according to the complexities thereof and an average complexity and a standard deviation of the complexities of all blocks in the same column. Here, the block classifying unit 331 classifies each block in the ROI on a column or row basis according to a duplication direction of ROI blocks.

The transform map creating unit 332 creates the transform map that indicates the duplication magnifications of the classified blocks. If it is defined according to complexities of each block in the ROI that a default basic duplication magnification of each block in the ROI is M, the transform map creating unit 332 assigns a duplication magnification of M+b to blocks having a high complexity, a duplication magnification of M−b to blocks having a low complexity, and a duplication magnification of M to blocks having an intermediate complexity. Here, b is a complexity coefficient representing an enlargement or reduction of duplicate blocks according to the complexity of each block. In addition, the transform map creating unit 332 assigns duplication magnifications to the region affected by duplication, which are non-ROI blocks located along the duplication direction of ROI blocks, so that the non-ROI blocks are downsized according to the duplication magnifications, and assigns a duplication magnification of 1 to blocks which are the region unaffected by duplication.

Figure 6:
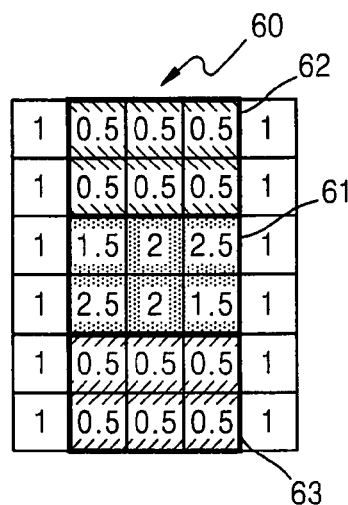
FIG. 6 illustrates a transform map corresponding to the duplicated image of FIG. 4.

FIG. 6 illustrates a transform map corresponding to the duplicated image 45 of FIG. 4.

In the ROI 41 of FIG. 4, it is assumed that the block A has a low complexity, the block D has a high complexity, the blocks B and E have intermediate complexities, the block C has a high complexity, and the block F has a low complexity. Also, it is assumed that the basic duplication magnification M is 2, and the complexity coefficient b is 0.5. After each block in the ROI 41 is classified as described above according to its complexity, the transform map creating unit 332 assigns a duplication magnification of M+b to the blocks having a high complexity, a duplication magnification of M−b to blocks having a low complexity, and a duplication magnification of M to blocks having an intermediate complexity. For example, the transform map creating unit 332 may create a transform map by assigning a duplication magnification of 1.5 to the block A, a duplication magnification of 2.5 to the block D, a duplication magnification of 2 to the blocks B and E, a duplication magnification of 2.5 to the block C, and a duplication magnification of 1.5 to the block F. In addition, the transform map creating unit 332 assigns a duplication magnification of 0.5 to blocks 62 and 63 that have to be reduced in size due to the duplication of blocks in the ROI 41.

The image transform unit 340 reconfigures an image by duplicating blocks in the ROI according to the duplication magnifications assigned to the block of the image, and downsizes blocks in the non-ROI which overlap the duplicate blocks in the ROI. For example, referring to FIGS. 4 and 6, the image transform unit 340 transforms the block A having an intermediate magnification of 1.5 into one duplicate block A1 having the same size as the original block A and a duplicate block A2 downsized by one half, and transforms the block D having a duplication magnification of 2.5 into two duplicate blocks D1 and D2 having the same size as the original block D and a duplicate block D3 downsized by one half. Similarly, the image transform unit 340 transforms the block 13 and the block E of the original image 40 having a duplicate magnification of 2 into two duplicate blocks B1 and B2 and two duplicate blocks E1 and E2 having the same size as the original blocks B and E, respectively.

Figure 7:
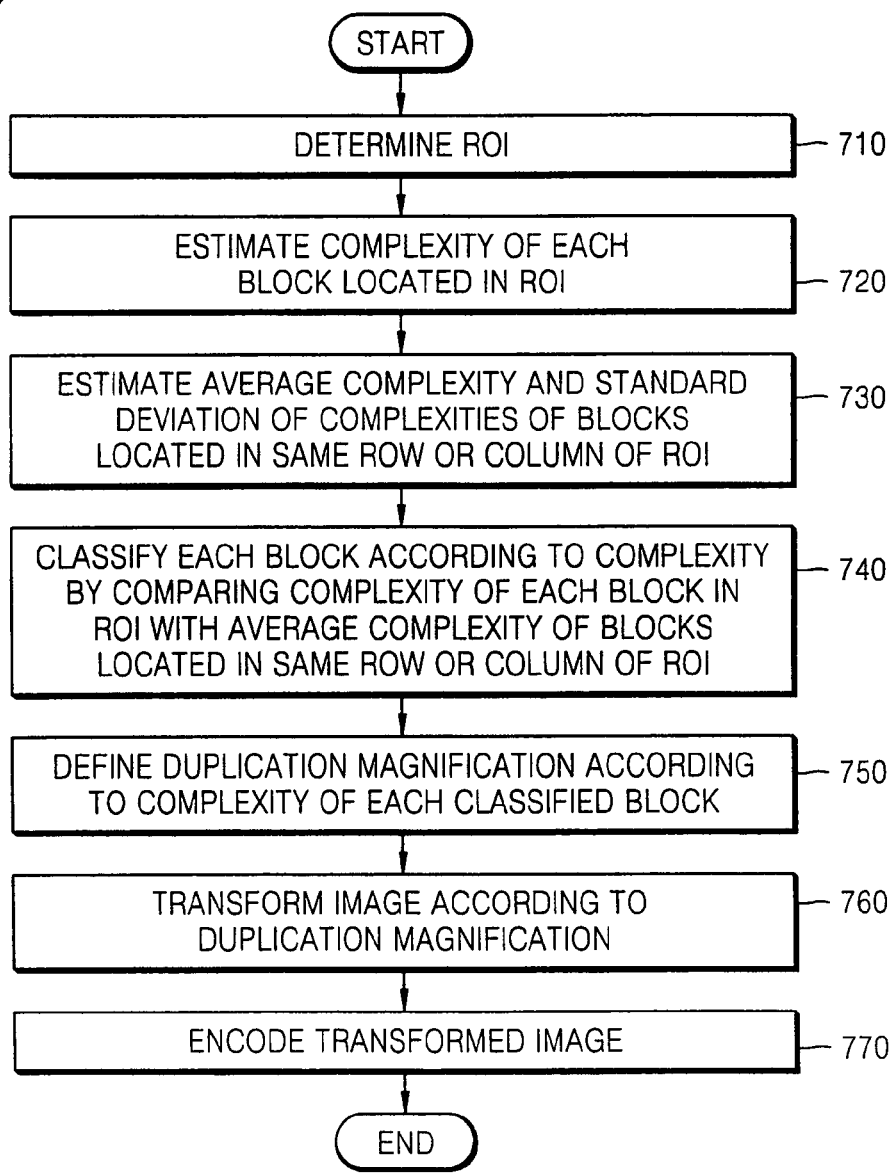
FIG. 7 is a flowchart illustrating an ROI based image encoding method according to an exemplary embodiment of the present invention.

FIG. 7 is a flowchart illustrating an ROI based image encoding method according to an exemplary embodiment of the present invention.

Referring to FIG. 7, in operation 710, an ROI of an image to be duplicated is determined according to a user's selection or an algorithm for determining the ROI.

In operation 720, the complexity of each block located in the ROI determined in operation 710 is estimated. As described above, the complexity of each block may be based on deviation, an MSE, or a SAD.

In operation 730, an average complexity and a standard deviation of the complexities of all blocks located in the same column or row of the ROI are estimated along a duplication direction in the ROI.

In operation 740, each block in the ROI is classified according to the complexity thereof by comparing an average complexity of blocks located in the same column or row of the ROI with the complexity of each block. Specifically, blocks having a complexity greater than the second threshold value Th2 are classified as blocks having a high complexity, blocks having a complexity lower than the first threshold value Th1 are classified as blocks having a low complexity, and blocks having a complexity between the first and second threshold values Th1 and Th2 are classified as blocks having an intermediate complexity. As described above, if m is defined as an average complexity of all blocks located in the same column or row in the ROI, $\sigma$ is a standard deviation of complexity, and a is a transform coefficient for dividing complexity sections (a is a real number), then blocks having a complexity greater than $m+(\sigma \times a)$ may be classified as blocks having a high complexity, blocks having a complexity lower than $m-(\sigma \times a)$ may be classified as blocks having a low complexity, and blocks having a complexity between $m-(\sigma \times a)$ and $m+(\sigma \times a)$ may be classified as blocks having an intermediate complexity.

In operation 750, duplication magnifications are respectively defined for the blocks classified in operation 740. As described above, if M is defined as a default basic duplication magnification, and b is a complexity coefficient, then a duplication magnification of M+b is assigned to blocks having a high complexity, a duplication magnification of M−b is assigned to blocks having a low complexity, and a duplication magnification of M is assigned to blocks having an intermediate complexity. In addition, duplication magnifications are assigned to non-ROI blocks which are located along a duplication direction of ROI blocks so that the non-ROI blocks are downsized according to the duplication magnifications, and assigns a duplication magnification of 1 to blocks which are located in the ROI but not located along the duplication direction.

In operation 760, each block is transformed according to the duplication magnifications assigned in operation 750, thereby reconfiguring the image.

In operation 770, the image reconfigured in operation 760 is compressed and encoded, thereby forming a bit-stream. Here, the duplication magnification of each block is transferred to a decoding end by adding information regarding the transform map into a header of the bit-stream.

Figure 8:
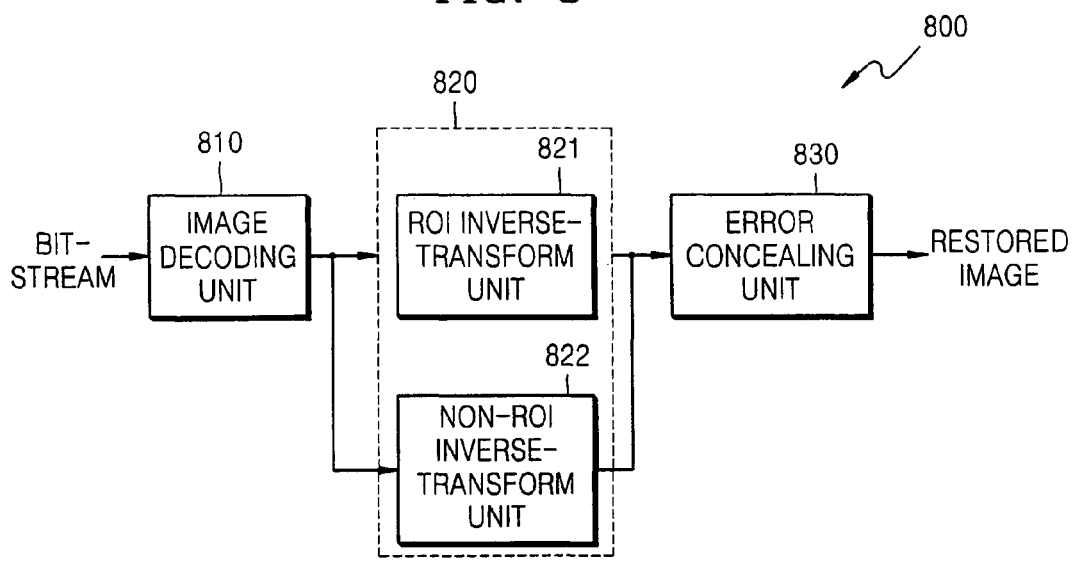
FIG. 8 is a block diagram of an ROI based image decoding apparatus according to an exemplary embodiment of the present invention.

FIG. 8 is a block diagram of an ROI based image decoding apparatus 800 according to an exemplary embodiment of the present invention.

Referring to FIG. 8, the ROI based image decoding apparatus 800 includes an image decoding unit 810, an image inverse-transform unit 820, and an error concealing unit 830.

The image decoding unit 810 receives a bit-stream encoded using the ROI based image encoding method and apparatus of the present invention, and decodes the received bit-stream. In addition, the image decoding unit 810 reads from the bit-stream information regarding a transform map including information regarding duplication magnifications of each block constituting an image. Here, the image output from the image decoding unit 810 is transformed image such as the transformed image 45 of FIG. 4 including ROI blocks duplicated according to specific duplication magnifications and non-ROI blocks which are downsized or unchanged.

The image inverse-transform unit 820 includes an ROI inverse-transform unit 821 and a non-ROI inverse-transform unit 822.

The ROI inverse-transform unit 821 inverse-transforms an image in the ROI by using a plurality of duplicate blocks which correspond to the same area of the ROI and are detected normally. For example, referring back to FIG. 4, in the decoded conversion image 45, an image corresponding to the block D of the original image is restored from any block which is detected without loss from the blocks D1 to D3 corresponding to the block D of the original image. When the block D1 is lost due to a channel error in the transformed image that is decoded by the image decoding unit 810, the block D of the original image can be restored from the block D2 equivalent to the block D1. When the block D2 is also lost, the block D of the original image can be restored from the block D3.

The non-ROI inverse-transform unit 822 restores blocks of the original image by enlarging non-ROI blocks which are downsized, and restoring non-ROI blocks which are not downsized without altering their size.

When all duplicate blocks in the ROI or blocks in the non-ROI are lost, the lost blocks can be restored from corresponding blocks in a previous/next frame or blocks around the lost blocks.

The error concealing unit 830 additionally restores errors due to a channel error using various conventional error concealing techniques.

Figure 9A:
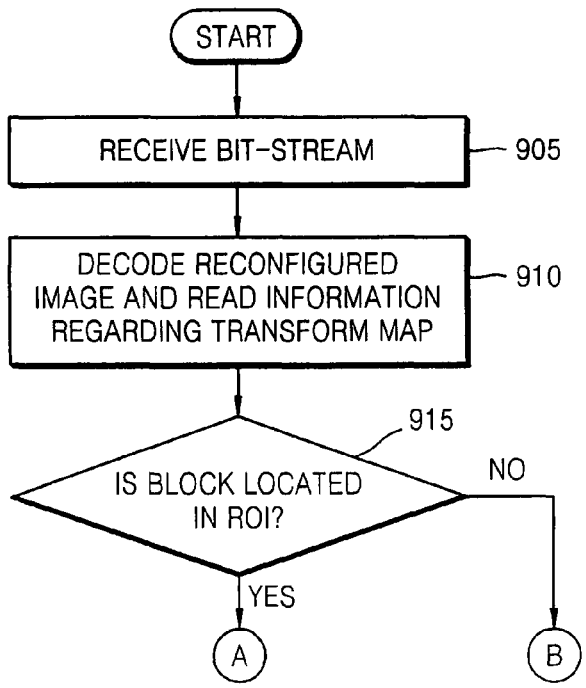
FIGS. 9A to 9C are flowcharts illustrating an ROI based image decoding method according to an exemplary embodiment of the present invention.
Figure 9B:
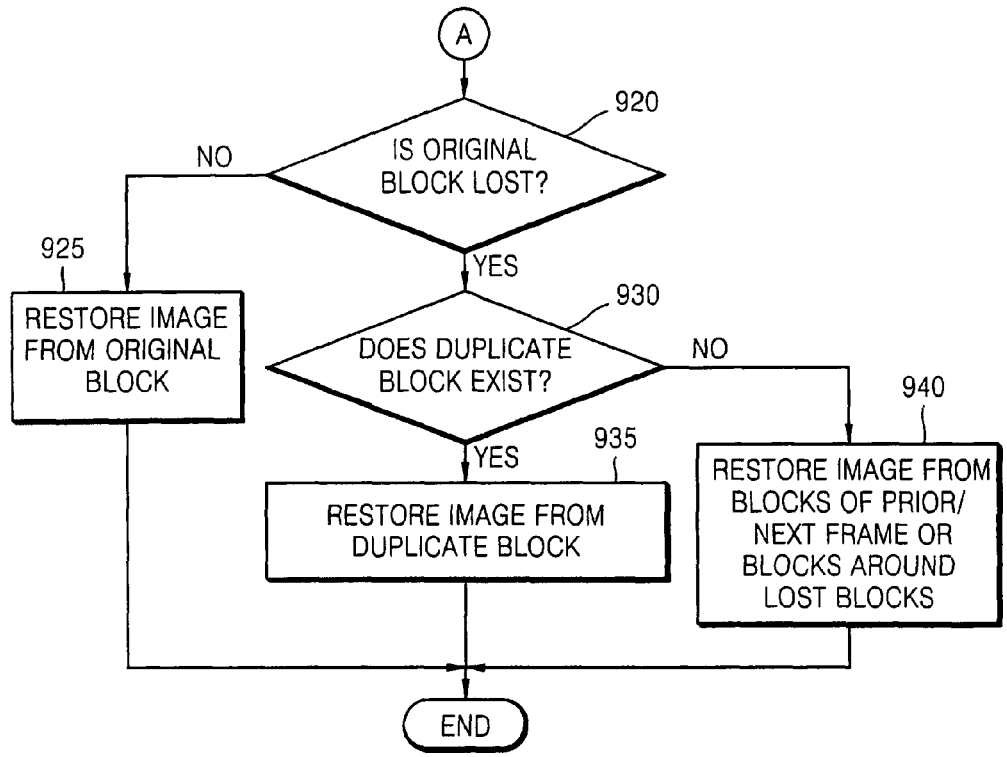
Figure 9C:
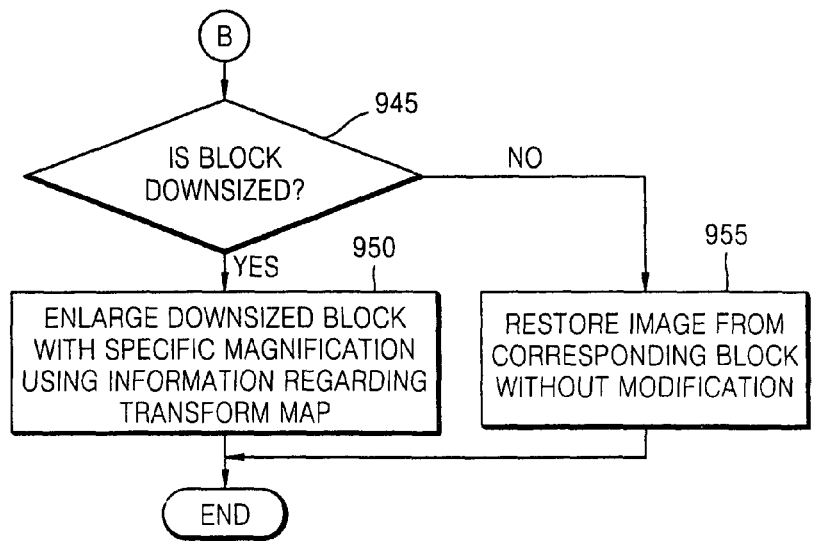

FIGS. 9A to 9C are flowcharts illustrating an ROI based image decoding method according to an exemplary embodiment of the present invention.

Referring to FIG. 9A, an encoded bit-stream of a transformed image including ROI blocks duplicated according to specific duplication magnifications and non-ROI blocks downsized or duplicated to the same size as the original blocks is received in operation 905.

In operation 910, the reconfigured conversion image is decoded, and a transform map informing the duplication magnification of each block is read from the bit-stream.

In operation 915, to restore the original image from the conversion image, it is determined whether a current block is located in the ROI.

Now, the process of restoring blocks in an ROI will be described with reference to FIG. 9B.

Referring to FIG. 9B, if it is determined that the current block is located in the ROI in operation 915, it is determined whether the original block is lost in operation 920. In operation 925, if the original block is not lost, an image is restored by using the current original block.

If the original block is lost, in operation 930, it is determined whether a duplicate block corresponding to the original image exists.

If it is determined that the duplicate block exists, the original image is restored from the duplicate block in operation 935. If it is determined that the duplicate block does not exist, the lost block is restored from corresponding blocks in a previous/next frame or blocks around the lost blocks in operation 940.

Now, the process of restoring a block in a non-ROI will be described with reference to FIG. 9C.

Referring to FIG. 9C, if it is determined that the current block is not located in the ROI in operation 915, it is determined whether the block in the non-ROI is a downsized block in operation 945. As described above, non-ROI blocks located along a duplication direction of ROI blocks are downsized, and the rest of the non-ROI blocks are encoded without any modification. Thus, a process to determine whether the non-ROI blocks are downsized is performed.

If it is determined that the block in the non-ROI is a downsized block, the downsized blocks in the non-ROI are enlarged using specific magnifications, thereby restoring blocks corresponding to the original image in operation 950. If it is determined that the block in the non-ROI is not a downsized block, blocks in the non-ROI which are encoded without any modification are restored without modification in operation 955.

According to the exemplary embodiments of the present invention, the duplication magnifications of blocks in an ROI can be determined in a variable manner according to the complexity of each block, thereby reducing a bit rate used while encoding, and information that is important can be encoded in an error resilient manner when bandwidth is limited. In addition, errors can be concealed since a lost block can be restored from a normally received duplicate block when errors occur.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and are not for purposes of limitation. Therefore, the scope of the invention is defined not by the detailed description of the invention but by the appended claims, and all differences within the scope will be construed as being included in the present invention.

What is claimed is:

1. An image encoding method based on a region of interest (ROI), the image encoding comprising:
   determining an ROI to be duplicated in an image to be encoded;
   estimating image features of blocks located in the ROI;
   defining duplication magnifications of the respective blocks located in the ROI using the estimated image features;
   transforming the image by duplicating the blocks located in the ROI in a specific direction according to the defined duplication magnifications; and
   encoding the transformed image.

2. The image encoding method of claim 1, wherein the estimating the image features of the blocks comprises:
   estimating a complexity of each of the blocks located in the ROI; and
   estimating an average complexity and a standard deviation of the complexities of the blocks located in a same column or row in the ROI using the estimated complexity of each of the blocks.

3. The image encoding method of claim 2, wherein the complexities are estimated by using at least one of a deviation, a mean square error and a sum of absolute differences of each of the blocks.

4. The image encoding method of claim 1, wherein the defining the duplication magnifications of each of the blocks located in the ROI comprises:
   classifying each of the blocks located in the ROI by comparing a complexity of each of the blocks with an average complexity of the blocks located in a same column or row in the ROI; and
   defining duplication magnifications of the classified blocks in proportion to the complexities of the classified blocks.

5. The image encoding method of claim 4, wherein the classifying each of the blocks comprises classifying blocks having a complexity higher than a first threshold value as blocks having a high complexity, classifying blocks having a complexity lower than a second threshold value as blocks having a low complexity, and classifying blocks having a complexity between the first and second threshold values as blocks having an intermediate complexity, wherein the first and second threshold values are determined based on the average complexity of the blocks located in the same column or row in the ROI.

6. The image encoding method of claim 5, wherein, if the average complexity of the blocks located in the same column or row in the ROI is m, a standard deviation of complexity is $\sigma$, and a transform coefficient for dividing complexity sections is a, where a is a real number, the first threshold value is $m+(\sigma \times a)$, and the second threshold value is $m-(\sigma \times a)$.

7. The image encoding method of claim 6, wherein the transform coefficient is determined such that a number of blocks having a high complexity is the same as a number of blocks having a low complexity.

8. The image encoding method of claim 4, wherein the defining the duplication magnifications of the classified blocks comprises determining a duplication magnification of blocks having a high complexity as M+b, a duplication magnification of blocks having a low complexity as M−b, and a duplication magnification of blocks having an intermediate complexity as M, wherein M is defined as a basic duplication magnification of each of the blocks in the ROI, and b, where b is a real number, is a complexity coefficient for representing an enlargement or reduction ratio of duplicate blocks according to the complexity of each of the blocks.

9. The image encoding method of claim 1, wherein the transforming the image comprises downsizing non-ROI blocks located along a duplication direction of ROI blocks.

10. The image encoding method of claim 1, wherein the encoding of the modified image comprises adding information regarding a transform map that indicates the duplication magnification of each of the blocks into a predetermined area of a bit-stream generated when encoding the reconfigured image.

11. An image encoding apparatus based on a region of interest (ROI), the image encoding apparatus comprising:
an ROI determining unit which determines an ROI to be duplicated in an image to be encoded;
an ROI feature estimating unit which estimates image features of blocks located in the ROI;
a duplication magnification defining unit which defines duplication magnifications of the respective blocks located in the ROI using the estimated image features;
an image transform unit which transforms the image by duplicating the blocks located in the ROI in a specific direction according to the defined duplication magnifications; and
an image encoding unit which encodes the transformed image.

12. The image encoding apparatus of claim 11, wherein the ROI feature estimating unit estimates a complexity of each of the blocks located in the ROI and an average complexity and a standard deviation of the complexities of blocks located in a same column or row of the ROI.

13. The image encoding apparatus of claim 12, wherein the ROI feature estimating unit estimates the complexities of each of the blocks by using at least one of a deviation, a mean square error and a sum of absolute differences of each of the blocks.

14. The image encoding apparatus of claim 11, wherein the duplication magnification defining unit comprises:
a block classifying unit which classifies each of the blocks located in the ROI by comparing a complexity of each of the blocks with an average complexity of the blocks located in a same column or row in the ROI; and
a transform map creating unit which creates a transform map that shows duplication magnifications of the classified blocks in proportion to the complexities of the classified blocks.

15. The image encoding apparatus of claim 13, wherein the block classifying unit classifies blocks having a complexity higher than a first threshold value as blocks having a high complexity, classifies blocks having a complexity lower than a second threshold value as blocks having a low complexity, and classifies blocks having a complexity between the first and second threshold values as blocks having an intermediate complexity, wherein the first and second threshold values are determined based on the average complexity of all of the blocks located in the same column or row in the ROI.

16. The image encoding apparatus of claim 15, wherein, if the average complexity of all of the blocks located in the same column or row in the ROI is m, a standard deviation of complexity is σ, and a transform coefficient for dividing complexity sections is a, where a is a real number, the first threshold value is m+(σ×a), and the second threshold value is m−(σ×a).

17. The image encoding apparatus of claim 16, wherein the transform coefficient is determined such that a number of the blocks having a high complexity is the same as a number of the blocks having a low complexity.

18. The image encoding apparatus of claim 14, wherein, the transform map creating unit determines a duplication magnification of blocks having a high complexity as M+b, a duplication magnification of blocks having a low complexity as M−b, and a duplication magnification of blocks having an intermediate complexity as M, wherein M is defined as a basic duplication magnification of each of the blocks in the ROI, and b, where b is a real number, is a complexity coefficient for representing an enlargement or reduction ratio of duplicate blocks according to the complexity of each of the blocks.

19. The image encoding apparatus of claim 11, wherein the image transform unit downsizes non-ROI blocks located along a duplication direction of ROI blocks.

20. The image encoding apparatus of claim 11, wherein the image encoding unit adds information regarding a transform map that that indicates the duplication magnification of each of the blocks into a predetermined area of a bit-stream generated when encoding the reconfigured image.

21. An image decoding method based on a region of interest (ROI), the image decoding method comprising:
receiving a bit-stream in which a transformed image is encoded by duplicating blocks located in the ROI according to duplication magnifications and downsizing blocks located in a non-ROI along a duplication direction of the blocks located in the ROI according to the duplication magnifications of the blocks located in the ROI;
decoding the transformed image and reading information regarding a transform map including information regarding the duplication magnifications of the blocks located in the ROI;
restoring an image in the ROI from a lossless block among a plurality of duplicate blocks in the ROI according to the information regarding the transform map; and
restoring an image in the non-ROI by enlarging an image of the downsized blocks according to the information regarding the transform map.

22. The image decoding method of claim 21, wherein the restoring the image in the ROI comprises:
determining whether a current block to be restored is lost; and
restoring the image in the ROI from other lossless blocks among the plurality of duplicate blocks if the current block to be restored is lost.

23. The image decoding method of claim 21, wherein, if duplicate blocks in the ROI or blocks in the non-ROI are lost, the lost blocks are restored from corresponding blocks in a previous or next image frame or blocks around the lost blocks.

24. An image decoding apparatus based on a region of interest (ROI), the image decoding apparatus comprising:
an image decoding unit which decodes a bit-stream in which a transformed image is encoded by duplicating blocks located in the ROI according to duplication magnifications and downsizing blocks located in a non-ROI along a duplication direction of the blocks located in the ROI according to the duplication magnifications of the blocks located in the ROI, and reads information regarding a transform map including information regarding the duplication magnifications of the blocks located in the ROI from the bit-stream; and an image inverse-transform unit which restores the image by inverse-transforming images in the ROI and non-ROI according to the information regarding the transform map.

25. The image decoding apparatus of claim 24, wherein the image inverse-transform unit further comprises:
an ROI inverse-transform unit which restores an image in the ROI from a lossless block among a plurality of duplicate blocks in the ROI according to the information regarding the transform map; and
a non-ROI inverse-transform unit which restores an image in the non-ROI by enlarging blocks corresponding to the downsized blocks in the non-ROI with a specific magnification according to the information regarding the transform map.

26. The image decoding apparatus of claim 24, wherein, if duplicate blocks in the ROI or blocks in the non-ROI are lost, the image inverse-transform unit restores the lost blocks from corresponding blocks in a previous or next image flame or blocks around the lost blocks.

\* \* \* \* \*